United States Patent
Gabor et al.

(10) Patent No.: US 12,030,497 B2
(45) Date of Patent: Jul. 9, 2024

(54) BRAKE SYSTEM WITH SHIFT OUT OF PARK SUPPORT

(71) Applicant: FORD GLOBAL TECHNOLOGIES, LLC, Dearborn, MI (US)

(72) Inventors: Daniel A. Gabor, Canton, MI (US); Mostafa Shuva, Warren, MI (US); Nolan Payne, Royal Oak, MI (US); Brandon J. Cameron, Canton, MI (US); Alex James, Ypsilanti, MI (US); Scott Mlynarczyk, South Lyon, MI (US); Bryan Griffin, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/944,496

(22) Filed: Sep. 14, 2022

(65) Prior Publication Data

US 2024/0083436 A1    Mar. 14, 2024

(51) Int. Cl.
| | |
|---|---|
| *F16H 63/48* | (2006.01) |
| *B60W 10/18* | (2012.01) |
| *B60W 10/192* | (2012.01) |
| *B60W 30/18* | (2012.01) |
| *F16H 59/66* | (2006.01) |

(52) U.S. Cl.
CPC .... *B60W 30/18118* (2013.01); *B60W 10/182* (2013.01); *B60W 10/192* (2013.01); *B60W 30/18027* (2013.01); *B60W 2510/182* (2013.01); *B60W 2530/10* (2013.01); *B60W 2552/15* (2020.02); *B60W 2710/182* (2013.01); *F16H 2059/663* (2013.01); *F16H 63/483* (2013.01)

(58) Field of Classification Search
CPC ......... B60W 30/18118; B60W 10/182; B60W 10/192; B60W 30/18027; B60W 2510/182; B60W 2530/10; B60W 2552/15; B60W 2710/182; F16H 63/483; F16H 2059/663
See application file for complete search history.

(56) References Cited

U.S. PATENT DOCUMENTS

| | | | |
|---|---|---|---|
| 10,571,023 B2 | 2/2020 | Neelakantan et al. | |
| 2007/0281827 A1* | 12/2007 | Shimizu | B60T 7/12 477/92 |
| 2013/0197731 A1 | 8/2013 | Schum et al. | |

(Continued)

FOREIGN PATENT DOCUMENTS

| | | |
|---|---|---|
| CN | 112776793 A | 5/2021 |
| CN | 111873964 B | 10/2021 |
| CN | 114313004 A | 4/2022 |

(Continued)

*Primary Examiner* — Justin Holmes
(74) *Attorney, Agent, or Firm* — Burr & Forman LLP; Lorne Forsythe

(57) ABSTRACT

A method for controlling brake pressure during a shift of a vehicle out of park may include determining that a first status condition is met when the vehicle is in park with an electric parking brake applied, determining that a second status condition is met when the vehicle is not moving, responsive to detecting a shift of the vehicle out of park when the first and second status conditions are both met, directing a build-up of brake pressure until a brake pressure target is reached, and holding the brake pressure at the brake pressure target until a release condition is met.

20 Claims, 4 Drawing Sheets

(56) References Cited

U.S. PATENT DOCUMENTS

2020/0032902 A1\* 1/2020 Neelakantan ........... F16H 63/48

FOREIGN PATENT DOCUMENTS

| DE | 102019220398 A1 | \* | 6/2020 | ............. B60T 1/005 |
| EP | 1967434 A1 | \* | 9/2008 | ............. B60T 1/005 |
| JP | 2003327101 A | \* | 11/2003 | ............ B60T 11/046 |
| JP | 2019147445 A | \* | 9/2019 | |

\* cited by examiner

BRAKE SYSTEM WITH SHIFT OUT OF PARK SUPPORT

TECHNICAL FIELD

Example embodiments generally relate to vehicle control algorithms and, more particularly, relate to a system and method for providing a brake system with shift out of park support.

BACKGROUND

In vehicle design, an electronic parking brake may be used as the primary device for holding the vehicle stationary while in the park position. In certain cases, even though the brake pedal is depressed in order to allow the operator to shift out of park, the service brake may need to remain applied for a brief period to prevent unintended movement. For example, when a vehicle is parked on an inclined surface, the driver, when shifting out of the park position, may apply less force to the brake pedal than the force required to hold the vehicle stationary on the inclined surface. This may allow the vehicle to roll, and the parking brake pads may also undergo unnecessary wear in this situation.

Thus, it may be desirable to develop a new approach for managing application of brake forces when shifting out of park.

BRIEF SUMMARY OF SOME EXAMPLES

In accordance with an example embodiment, a method for controlling brake pressure during a shift of a vehicle out of park may be provided. The method may include determining that a first status condition is met when the vehicle is in park with an electric parking brake applied, determining that a second status condition is met when the vehicle is not moving, responsive to detecting a shift of the vehicle out of park when the first and second status conditions are both met, directing a build-up of brake pressure until a brake pressure target is reached, and holding the brake pressure at the brake pressure target until a release condition is met.

In another example embodiment, a vehicle control system for a vehicle may be provided. The system may include a gear selector operably coupled to a transmission of the vehicle to shift the vehicle between various states including at least drive, reverse and park, a braking torque module operably coupled to brake hardware of the vehicle to provide braking force or braking torque to brake hardware based on a brake pedal position, an electric park brake, and a hold controller operably coupled to a sensor network of the vehicle to receive vehicle status information to perform a method for controlling brake pressure during a shift of a vehicle out of park. The method may include determining that a first status condition is met when the vehicle is in park with an electric parking brake applied, determining that a second status condition is met when the vehicle is not moving, responsive to detecting a shift of the vehicle out of park when the first and second status conditions are both met, directing a build-up of brake pressure until a brake pressure target is reached, and holding the brake pressure at the brake pressure target until a release condition is met.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
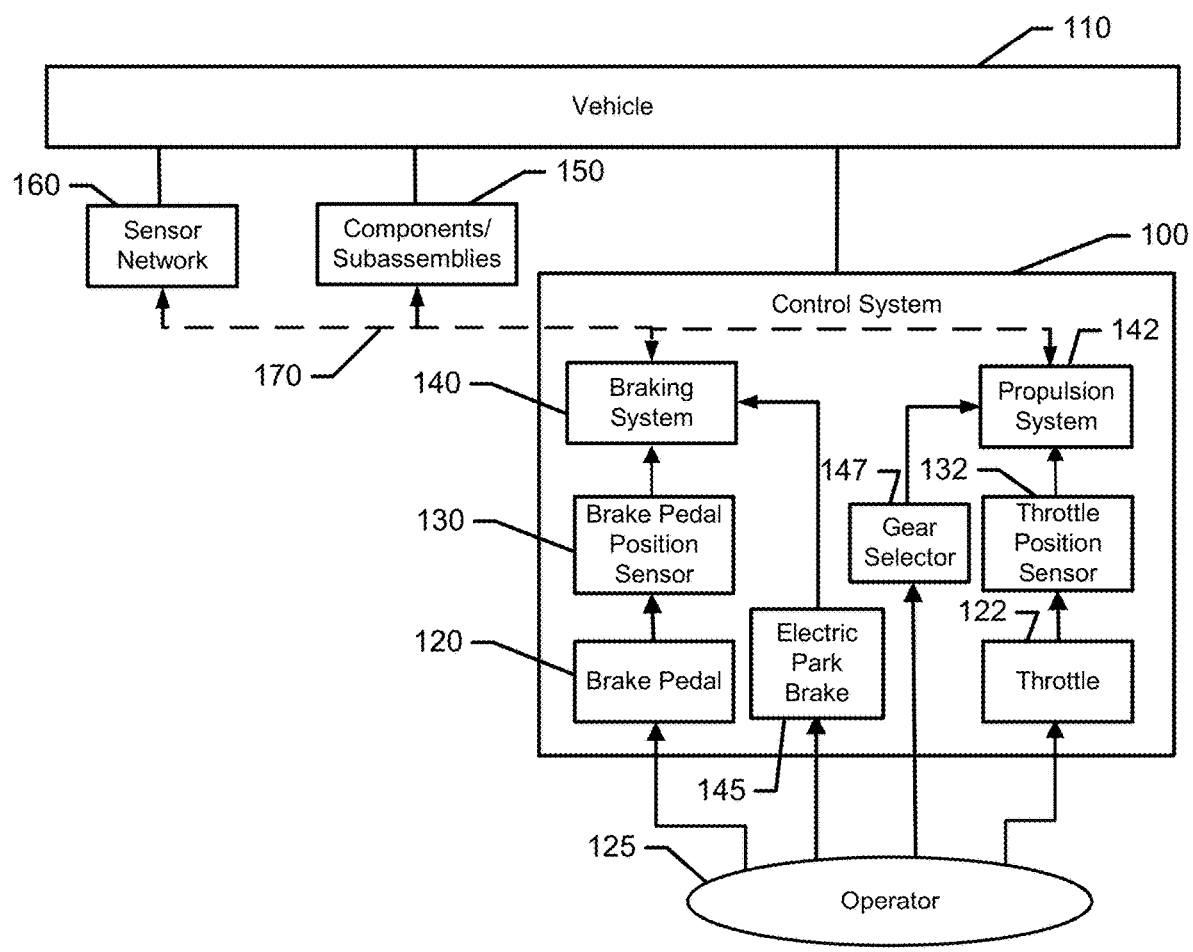
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, shifting out of park with insufficient pedal pressure applied may cause the vehicle to roll, if on an incline, and may also have negative effects on the parking brake. Data also shows that the parking brake experiences increased wear over time when there is not a buildup of brake line pressure to a sufficient level to seal the needed valves between the application and release of the parking brake. A hill start assist function may be employed in some vehicles to apply brake pressure to hold the vehicle on an incline when the vehicle is stopped on an incline while shifted in either drive or reverse. The hill start assist function applies brake pressure to hold the vehicle on the incline for about two seconds to prevent rolling in the short space of time between when the driver releases the brake to apply pressure to the gas pedal or throttle. However, the hill start function requires the vehicle to already be in drive or reverse facing up or down a hill, respectively, and requires some initialization time required for the hill start function to be available after initial key on of the vehicle. Thus, a tool is needed to check conditions when the vehicle is first keyed on and shifted out of park to decide if brake pressure is needed to hold the vehicle on an inclined surface and minimize wear on the parking brake. Example embodiments may provide such an approach.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120 and a throttle 122 (or gas pedal). However, the control pedals could alternatively be hand operated or any other operable member via which an operator 125 may provide an input indicative of an intent of the operator relative to controlling net torque for application to the wheels of the vehicle 110.

The control system 100 may also include position sensors for each of the brake pedal 120 (which may have a corresponding brake pedal position sensor 130) and the throttle 122 (which may have a corresponding throttle position sensor 132). The brake pedal position sensor 130 and the throttle position sensor 132 may provide data indicative of the precise position of the brake pedal 120 and the throttle 122, respectively. The data indicative of pedal position may then be provided to respective ones of the a braking system 140 and a propulsion system 142, which may include components that provide for braking torque application and propulsion torque application, respectively. The braking and propulsion systems 140 and 142 may be configured to determine individual inputs of negative and positive torque (e.g., net torque) as described herein based on inputs from the brake pedal position sensor 130, the throttle position sensor 132, or other components of the vehicle 110. In some cases, the control system 100 may be configured to perform other tasks related or not related to propulsive and braking control or performance management.

In some embodiments, the control system 100 may further include an electric park brake 145 and a gear selector 147. The electric park brake 145 may be operable by the operator 125 via a button, lever, pedal, or other actuator disposed in the cabin of the vehicle 110 and accessible to the operator 125. When actuated, the electric park brake 145 may provide an input to the braking system 140 that causes the braking system 140 to apply braking torque to the wheels of the vehicle 110 to hold the vehicle 110, particularly on an incline or hill. Meanwhile, the gear selector 147 (which could be a gear shifter for a manual transmission) may operate to engage the output shaft(s) of the propulsion system 142 in a corresponding selected or desired gear or direction. Thus, for example, the propulsion system 142 applies propulsive torque in the forward direction when the gear selector 147 is positioned in drive or one of the drive gears. However, the propulsion system 142 applies propulsive torque in the rearward direction when the gear selector 147 is positioned in reverse. Meanwhile, when the gear selector 147 is placed in park, no propulsive torque may be requested to or provided from the propulsion system 142 and, in some cases the electric park brake 145 may be activated or ready for activation by the operator 125.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170.

The components or subassemblies 150 may include, for example, components of the braking system 140, the propulsion system 142 and/or a wheel assembly of the vehicle 110 among other components/subassemblies. The braking system 140 may be structured to provide braking inputs to braking components of the vehicle 110 (e.g., electro-mechanical brakes, hydraulic brakes, regenerative brakes, etc.) based on a braking torque determined by a torque control module. The braking system 140 may also include more than one type of braking hardware. For example, the braking system 140 of the vehicle 110 may include a combination of hydraulic brakes and electro-mechanical brakes. In an example embodiment, the braking system 140 may be a brake-by-wire system, may employ regenerative braking, or any other suitable type of brake system.

The propulsion system 142 may include a gas engine, electric motor, or any other suitable propulsion device. In some cases, the propulsion system 142 may also incorporate drive-by-wire components and a corresponding control paradigm. Thus, the vehicle 110 (using the braking system 140 and the propulsion system 142) may determine either or both of propulsive and braking torque inputs for provision to the propulsion system 142 and braking system 140 to apply the respective form of positive or negative torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, rate of change of vehicle velocity, front/rear wheel speeds, vehicle pitch, etc.

Accordingly, for example, the control system 100 may be able to receive numerous different parameters, indications and other information that may be related to or indicative of different situations or conditions associated with vehicle status. The control system 100 may also receive information indicative of the intent of the operator 125 (or autonomous control system) relative to control of various aspects of operation of the vehicle 110 and then be configured to use the information received to provide instructions to the braking system 140 and the propulsion system 142 in order to control application of net torque to the wheels of the wheel assembly of the vehicle 110. The control system 100 of FIG. 1 may be similar to conventional systems in many respects, except that, the control system 100 (and in some cases specifically the braking system 140) may be modified to dynamically adjust brake pressure at vehicle start to provide a shift out of park support feature as described in greater detail in reference to FIGS. 2-4.

Figure 2:
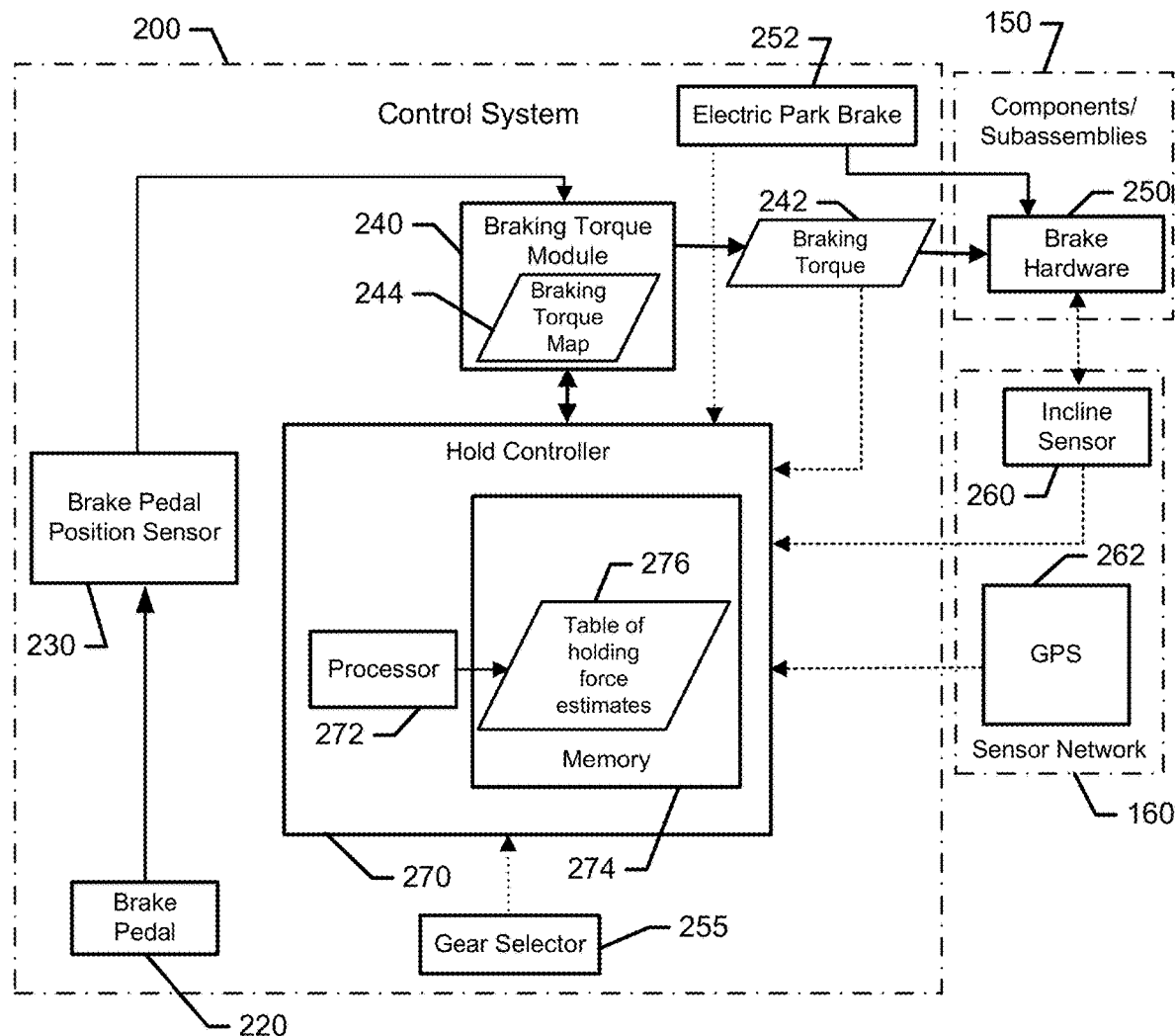
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates example interactions for the control system 200 between a brake pedal 220 (e.g., an example of brake pedal 120 of FIG. 1), a brake pedal position sensor 230 (e.g., an example of brake pedal position sensor 130 of FIG. 1), a braking torque module 240 (e.g., which generates commands or instructions for braking torque 242) and the components or subassemblies 150 relative to information received thereby (e.g., from the sensor network 160, from various ones of the components/subassemblies 150, and/or from the operator 125).

The control system 200 may include the brake pedal 220, which may have the corresponding brake pedal position sensor 230, to enable the braking torque module 240 to define the requests or commands for braking torque 242 to the braking system 140. The braking system 140 may include brake hardware 250, which may include hydraulic and friction braking components, electromechanical braking components such as actuators, motors and/or other individual braking components. In some embodiments, the control system 200 may receive an input from an operator 125 in the form of a force applied to the brake pedal 220. The control system 200 may then communicate the amount of travel of the corresponding pedal that is caused by the force applied by the operator 125 to the braking torque module 240 in the form of an electronic signal via the brake pedal position sensor 230. In some embodiments, the brake pedal position sensor 230 may include a Hall effect sensor or similar type sensor. The pedal position may then be provided to the braking torque module 240 for use as described in greater detail below. In some embodiments, pedal position may be an example of information indicative of operational intent of the operator 125. Moreover, if hydraulic brakes are employed, the pressure applied to the brake pedal 220 may be transmitted hydraulically to the brake hardware 250 without requiring the brake pedal position sensor 230.

The braking torque module 240 may be configured to receive information indicative of operational intent of the operator 125 (e.g., data from the brake pedal position sensor 230) and, in some cases, also information indicative of vehicle status (e.g., vehicle speed, direction and/or other parameters) from the sensor network 160. Based on the operational intent and/or vehicle status, the braking torque module 240 may determine a braking torque 242 to be applied via the brake hardware 250 of the vehicle 110. In other words, braking torque 242 may be considered to be representative of a braking torque request, or a request for a corresponding determined amount of braking torque 242. The braking torque module 240 may determine the braking torque 242 using a braking torque map 244, which may be constructed to balance the information indicative of vehicle status with the information indicative of operational intent of the operator 125 in order to infer the desired value for the braking torque 242 of the operator 125. In an example embodiment, the braking torque map 244 may be generated or otherwise provided by the manufacturer. The braking torque map 244 may be generated based on test data gathered over many hours of testing in numerous different conditions and situations. In some cases, the braking torque map 244 may provide a mapping of brake pedal positions (e.g., as detected by the brake pedal position sensor 230) to corresponding braking torque 242 values to provide to the brake hardware 250. Thus, for example, the full range of pedal positions may be mapped to corresponding values of the braking torque 242.

Electric park brake 252 (an example of the electric park brake 145 of FIG. 1) may also provide an input to the brake hardware 250 to employ the brake hardware 250 to apply a holding force to the wheels of the vehicle 110. However, as noted above, issues may arise when shifting out of park if the operator 125 does not apply sufficient pressure to the brake pedal 220. To address this issue, example embodiments may employ a hold controller 270 as described herein, which functions to generate a temporary holding force to apply through the brake system of the vehicle 110 to prevent wearing of the electric park brake 252 and to ensure that momentary vehicle rolling upon shifting out of park on an incline does not occur.

The hold controller 270 may receive an input from the electric park brake 252 (either directly or via the sensor network 160 and/or vehicle communication bus 170) to indicate a status of the electric park brake 252 (e.g., engaged/applied or disengaged/released). The hold controller 270 may also receive input from a gear selector 255 (e.g., an example of gear selector 147 of FIG. 1), which may be operably coupled to a transmission of the vehicle 110 to shift the vehicle between various driving states including at least a drive state, a reverse state and a parked state. These respective states may simply be referred to as drive, reverse and park, and selectable options on the gear selector 255. The hold controller 270 may also be made aware of the amount of braking torque 242 being requested (either always, or at least when the hold controller 270 is active). Additionally, the hold controller 270 may be operably coupled to various other sensors of the sensor network 160 to receive information descriptive of vehicle status information. The vehicle status information may include the inputs to the hold controller 270 that are described above in some cases (e.g., provided via the vehicle communication bus 170), but may also include other parameters that may be descriptive of various vehicle states. As examples, the sensor network 160 may include an incline sensor 260 (e.g., a gyroscope, accelerometer, inclinometer, tilt sensor, etc.) specifically configured to detect an angle of incline of the vehicle 110 (or of the surface upon which the vehicle 110 is supported) or a global positioning system (GPS) receiver that may be capable of doing the same among other position determining functions. In any case, the sensor network 160 may provide the hold controller 270 with inputs sufficient to inform the hold controller 270 of the degree of angle or incline of the vehicle 110 or surface on which the vehicle 110 is parked, or to enable the hold controller 270 to determine the same.

As mentioned above, the hold controller 270 may be configured to provide a temporary augmenting brake force to hold the vehicle when shifting out of park, particularly on an incline. This temporary augmenting brake force may assist in preventing any unintended rolling of the vehicle 110 at the initial moment after the shift out of park and before the operator 125 has time to either apply the throttle or the brake pedal to prevent such rolling. To accomplish this, the hold controller 270 may determine whether certain conditions for applying the augmenting brake force are met, and then apply the augmenting brake force for a temporally limited period, as described in greater detail below. The augmenting brake force may also be dynamically determined and applied in each individual situation. In an example embodiment, the augmenting brake force may be determined as the maximum or largest value among three candidate values. The three candidate values may include 1) the brake pressure requested by the driver (e.g., the braking torque 242) based on input to the brake pedal 220, 2) the pressure required to hold the vehicle (e.g., a holding force) on an incline or slope the vehicle is on for the estimated vehicle mass of the vehicle, and 3) a minimum brake pressure build needed between each park brake application to prevent wear of the electric park brake 252.

The hold controller 270 may include processing circuitry (e.g., a processor 272 and memory 274) that is programmable to update and maintain one or more instances of a look up table. Each instance (if there are more than one) of the look up table may have corresponding different mappings of parameters, relationships, or values that may be pertinent to the operation of the hold controller 270. Thus, for example, one of the tables may be a table of holding force estimates 276 that define the holding force mentioned above, which is one of the candidate values to consider to be temporarily applied. The table of holding force estimates 276 may define a series of values of hold pressure or braking torque that may be supplied to one or more components of the brake hardware 250 to supplement the braking torque 242 requested by the brake pedal 220 (if the value requested is not sufficient), to ensure that sufficient brake pressure is applied via the brake hardware 250 when shifting out of park and/or when the electric park brake 252 is released. In this regard, in some embodiments, the hold pressure determined from the table of holding force estimates 276 may be determined from a mapping of an amount of slope (e.g., of the vehicle 110 or surface on which the vehicle 110 is parked) and an estimation of vehicle mass. In such an example, the holding force may be considered to be an estimated holding force to hold a vehicle having the estimated mass of the vehicle 110 on the incline of the slope of the vehicle 110.

In some embodiments, the estimated mass of the vehicle 110 may depend on vehicle type. For example, specific models and modifications thereto may have known base weight or mass values. However, those base numbers are modified by the amount of loading that the vehicle 110 carries at any given time. The amount of loading may, in some cases, be estimable based on suspension position or ride height measurements. Thus, for example, sensors (e.g., ride height sensors, on board scales or other suspension position sensors) of the sensor network 160 may provide information to the hold controller 270 that enable the hold controller 270 to determine vehicle loading. In such examples, estimated vehicle mass may be a combination of the base weight or mass value modified by the vehicle loading determined based on sensor readings. Estimated vehicle mass may be one entry item into the table of holding force estimates 276, and slope (or angle of incline) may be another. In some cases it may be possible to determine a vehicle mass estimation without on board scales or other sensors, but doing so may involve driving the vehicle for a short period of time. In such an example, an assumed gross vehicle weight may be used until a mass estimation has been determined. For example, first ignition on and shift out of park may have a low fidelity or unknown mass estimation. If vehicle has previously been moving during the same ignition/drive cycle, then a high fidelity mass estimation may be known.

In an example embodiment, the table of holding force estimates 276, and in some cases also any of the other tables that feed data into the table of holding force estimates 276, may be dynamically updated via machine learning. In such cases, learning estimates may be continuously evaluated for accuracy either on an individual basis for each individual vehicle, or across a fleet of vehicles, or all vehicles. When learning is performed with respect to groups of vehicles, the hold controller 270 may be configured to communicate measurements and data at one instance of the vehicle 110 to a central location (e.g., the cloud), and the manufacturer or another entity with tools in the cloud may employ machine learning to update the table of holding force estimates 276 (or other tables) of all vehicles in the group with push messages, or other software updates. In some embodiments, the table 276 may be a 2-D look up table that may be used for determining a holding force in which the values of the table are predetermined during the calibration phase of program development. The 2-D look up table may have two inputs including a gradient estimation and mass estimation, and may output an estimated holding force.

In some cases, the minimum brake pressure defined for wear prevention may be a fixed value defined based on vehicle type. That value may therefore be shared across all vehicles of the same type. However, it should be noted that although the value is typically set by the manufacturer when vehicles are manufactured, the manufacturer may update the value and, like updates to tables mentioned above, the manufacturer may send push messages or other software updates to groups of vehicles to update the fixed value if research or data evaluated by the manufacturer suggests that an update should be provided.

Having all three candidate values determined or available, the hold controller 270 may compare the three candidate values when a trigger scenario is detected, and apply the largest of the three candidate values. In the example of FIG. 2, the hold controller 270 may interface with the braking torque module 240 to define an increase to the braking torque 242 requested if the braking torque 242 requested is lower than the holding force determined by the hold controller 270 or is lower than the minimum brake pressure defined for wear prevention (i.e., wear prevention of the electric park brake 252).

In an example embodiment, the trigger scenario mentioned above may also be determined by the hold controller 270, and the period of time that the temporary augmenting brake force is to be applied may also be determined by the hold controller 270. The trigger scenario may include detection of the following situations after key on or startup of the vehicle 110. The situations may include the vehicle being turned on, the electric park brake 252 being applied, and the vehicle being in park and not moving. These situations may be combined to define vehicle status conditions in any suitable way. For example, the trigger scenario may be considered to include determining that a first status condition is met when the vehicle is in park with the electric park brake 252 applied, and determining that a second status condition is met when the vehicle is not moving. Responsive to detecting a shift of the vehicle out of park when the first and second status conditions are both met, the trigger scenario may be considered to be satisfied, and the hold controller 270 may direct or initiate a build-up of brake pressure until a brake pressure target is reached. The brake pressure target may be the temporary augmenting brake force described in detail above.

The hold controller 270 may then direct holding the brake pressure at the brake pressure target until a release condition is met. The release condition of an example embodiment may include elapse of a predetermined period of time (e.g., 1 or 2 seconds) which may be selected to be long enough for a handover to an autonomous longitudinal controller (e.g., thereby delaying long enough for a hill start assist function to take over), or receiving a driver input indicating a pressure release request. Thus, for example, the predetermined period of time may be selected as a period of time that is judged to be sufficient to allow other brake force augmenting functions (e.g., such as the hill start assist function) to operate. The hill start assist function may apply brake pressure while in drive or reverse on a slope and releasing the brake. The predetermined period of time may be capable of calibration or updating (e.g., via looking at wheel speeds and if the predetermined torque is not sufficient to stop the wheels, building until there is sufficient torque to stop the vehicle) in some embodiments. Moreover, in some cases, there may be multiple potential brake pressure release rates depending on which release condition is met. For example, a faster release rate may be employed if it is triggered by the driver applying the pedal and a slower release rate may be employed otherwise (e.g., if it is just based on the time expiring in order to make it more controllable).

Figure 3:
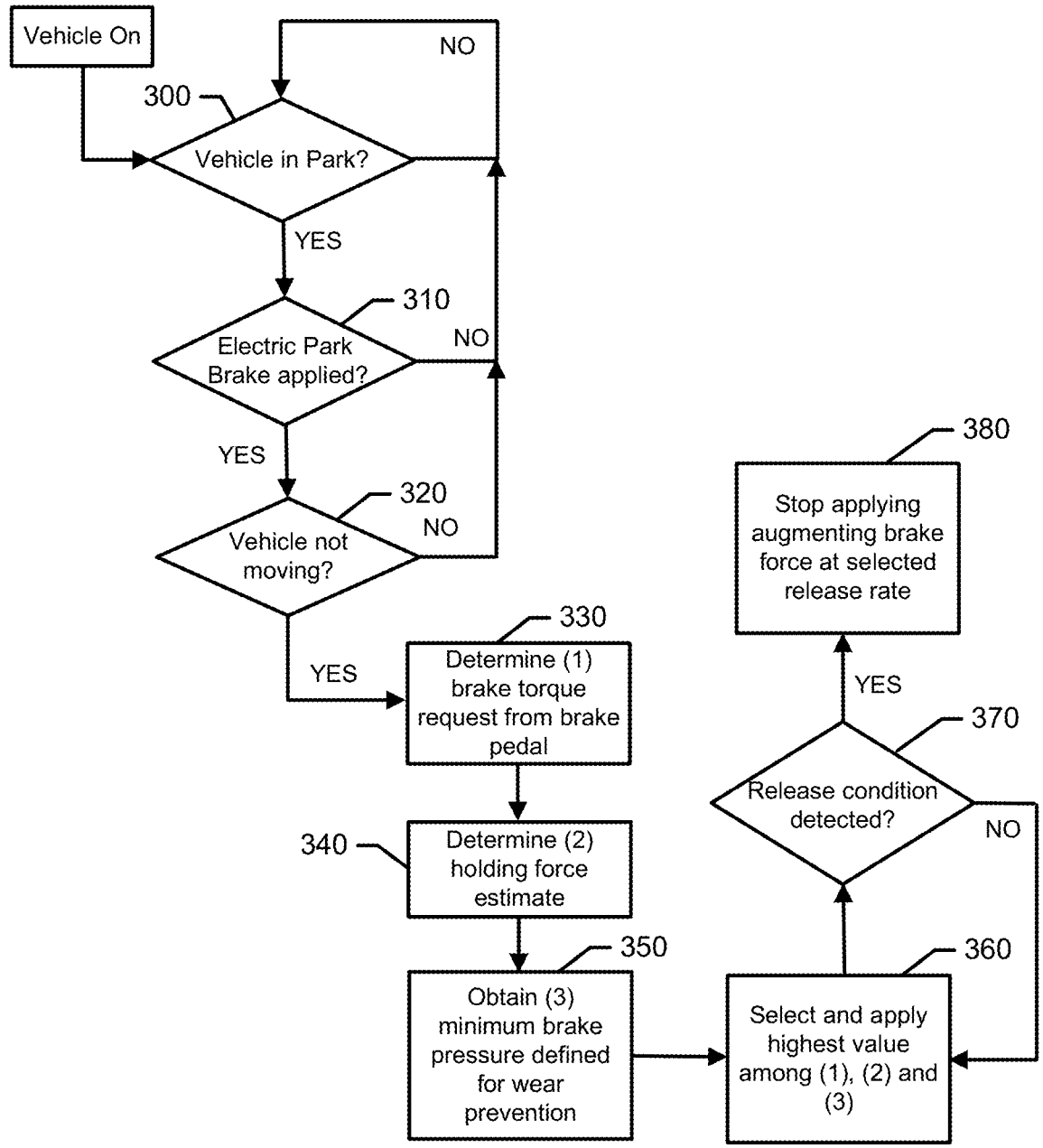
FIG. 3 illustrates a block diagram of a process or algorithm for managing brake pressure during a shift of a vehicle out of park according to an example embodiment.

FIG. 3 illustrates a block diagram of a process or algorithm for providing a shift out of park support according to an example embodiment. Thus, for example, the control system 200 (or more particularly the hold controller 270) may execute the process shown in FIG. 3 responsive to initial keying on of the vehicle. After vehicle startup, a determination may be made as to whether the vehicle is in park at operation 300. If in park, a further determination may be made as to whether the electric park brake is applied at operation 310. If the electric park brake is also applied, then a further determination may be made as to whether the vehicle is not moving (i.e., standing still) at operation 320. Notably, the operations 300 to 320 may be performed in any order and, if any of the operations produces a negative result, monitoring for a positive result for all three continues. Moreover, all three operations may be performed simultaneously. It is only when all three operations (any of which may be combined into a single condition) have a positive result that an exit from the monitoring cycle is achieved and the conditions for applying the temporary augmenting brake force described above is applied.

When all three operations 300 to 320 (regardless of order) produce a positive result, flow may proceed to operations 330 to 350, which again may be performed in any order. In this case, operation 330 includes determining a first value corresponding to a brake torque request from the brake pedal. Operation 340 includes determining a second value comprising a holding force estimate (which may be performed as described above using the table of holding force estimates 276 or any other suitable method). Operation 350 includes obtaining a third value, which is a minimum brake pressure defined for wear prevention of the electric park brake. After the first, second and third values have been determined, the largest of the three values is selected for application at operation 360.

Thereafter, a monitoring cycle begins to detect a release condition at operation 370. The release condition may be, for example, either elapse of a predetermined time period, handover to a hill start assist function or the like, or receiving a release request from the driver. The release request may be the driver applying force to the throttle in some cases. If a positive result flows from operation 370, the augmenting brake force will be stopped at a selected release rate operation 380. However, if operation 370 generates a negative result, monitoring will continue with the selected pressure applied. Notably, the algorithm shown by FIG. 3 can be modified in various ways and still achieve similar results. Thus, the example depicted should be appreciated as being non-limiting.

Figure 4:
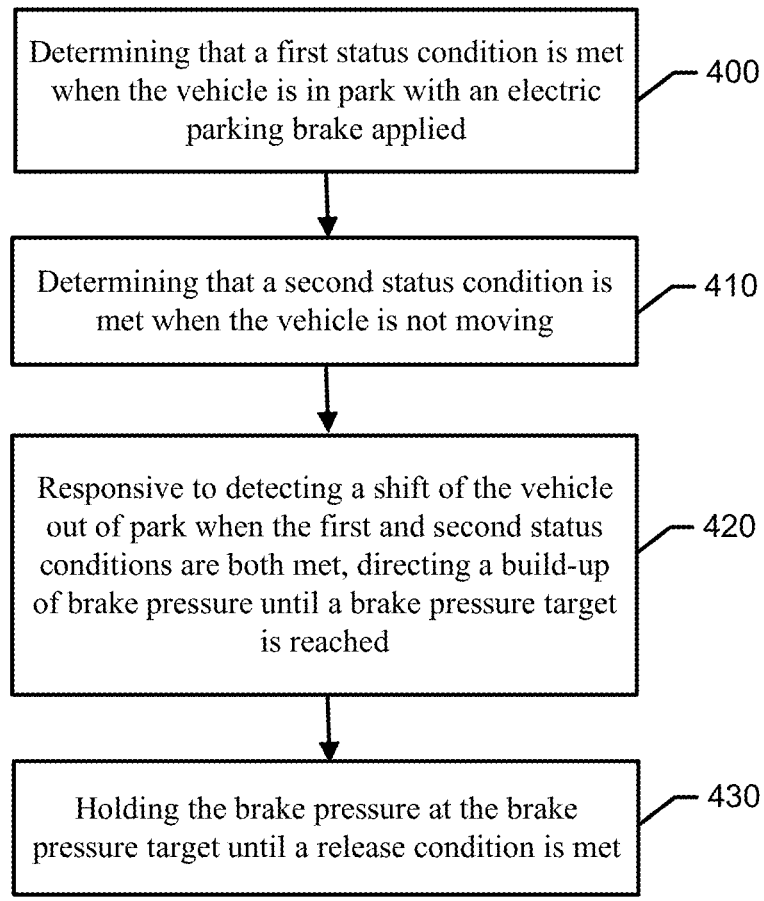
FIG. 4 illustrates a method of controlling brake pressure during a shift of a vehicle out of park according to an example embodiment.

A method for controlling brake pressure during a shift of a vehicle out of park is shown in the block diagram of FIG. 4, and a vehicle control system for practicing the method may therefore also be provided. The system may include a gear selector operably coupled to a transmission of the vehicle to shift the vehicle between various states including at least drive, reverse and park, a braking torque module operably coupled to brake hardware of the vehicle to provide braking force or braking torque to brake hardware based on a brake pedal position, an electric park brake, and a hold controller operably coupled to a sensor network of the vehicle to receive vehicle status information to perform the method. The method may include determining that a first status condition is met when the vehicle is in park with an electric parking brake applied at operation 400, determining that a second status condition is met when the vehicle is not moving at operation 410, responsive to detecting a shift of the vehicle out of park when the first and second status conditions are both met, directing a build-up of brake pressure until a brake pressure target is reached at operation 420, and holding the brake pressure at the brake pressure target until a release condition is met at operation 430.

The method and system of some embodiments may include additional operations, features, modifications, augmentations and/or the like to achieve further objectives or enhance performance of the system. The additional operations, features, modifications, augmentations and/or the like may be added in any combination with each other. Below is a list of various additional operations, features, modifications, and augmentations that can each be added individually or in any combination with each other. For example, the release condition may be embodied as, in some cases, elapse of a predetermined period of time, or receiving a driver input indicating a pressure release request. In an example embodiment, the brake pressure target may be determined by first determining a brake pressure requested by a driver of the vehicle based on a brake pedal input, determining a hold pressure required to hold the vehicle based on a current vehicle state, and a minimum brake pressure defined for wear prevention of the electric parking brake. Thereafter, the brake pressure target may be selected as a largest value among the brake pressure requested by the driver, the hold pressure and the minimum brake pressure defined for wear prevention. In some cases, the current vehicle state may be determined as or based on an estimation of vehicle mass and a determination of an amount of slope of a surface on which the vehicle is parked. In an example embodiment, the estimation of vehicle mass may be determined based on vehicle weight and an estimation of vehicle load. In some cases, the hold pressure may be determined from a table mapping the amount of slope and the estimation of vehicle mass to an estimated holding force. In some cases, the minimum brake pressure defined for wear prevention may be a fixed value defined based on vehicle type.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for controlling brake pressure during a shift of a vehicle out of park, the method comprising:
determining that a first status condition is met when the vehicle is in park with an electric parking brake applied;
determining that a second status condition is met when the vehicle is not moving;

responsive to detecting a shift of the vehicle out of park when the first and second status conditions are both met, directing a build-up of brake pressure until a brake pressure target is reached; and holding the brake pressure at the brake pressure target until a release condition is met, wherein the release condition comprises elapse of a predetermined period of time to enable handover to a hill start assist function.

2. The method of claim 1, wherein the release condition comprises elapse of a predetermined period of time.

3. The method of claim 1, wherein the release condition comprises receiving a driver input indicating a pressure release request.

4. A method for controlling brake pressure during a shift of a vehicle out of park, the method comprising:

determining that a first status condition is met when the vehicle is in park with an electric parking brake applied;

determining that a second status condition is met when the vehicle is not moving;

responsive to detecting a shift of the vehicle out of park when the first and second status conditions are both met, directing a build-up of brake pressure until a brake pressure target is reached; and holding the brake pressure at the brake pressure target until a release condition is met, wherein the brake pressure target is determined by:

determining a brake pressure requested by a driver of the vehicle based on a brake pedal input;

determining a hold pressure required to hold the vehicle based on a current vehicle state; and obtaining a minimum brake pressure defined for wear prevention of the electric parking brake.

5. The method of claim 4, wherein the release condition comprises an elapse of a predetermined period of time to enable handover to a hill start assist function.

6. The method of claim 4, wherein the brake pressure target is a largest value among the brake pressure requested by the driver, the hold pressure and the minimum brake pressure defined for wear prevention.

7. The method of claim 4, wherein the current vehicle state comprises an estimation of vehicle mass and a determination of an amount of slope of a surface on which the vehicle is parked.

8. The method of claim 7, wherein the estimation of vehicle mass is determined based on vehicle weight and an estimation of vehicle load.

9. The method of claim 8, wherein the hold pressure is determined from a table mapping the amount of slope and the estimation of vehicle mass to an estimated holding force.

10. The method of claim 4, wherein the minimum brake pressure defined for wear prevention is a fixed value defined based on vehicle type.

11. A vehicle control system comprising:

a gear selector operably coupled to a transmission of the vehicle to shift the vehicle between various states including at least drive, reverse and park;

a braking torque module operably coupled to brake hardware of the vehicle to provide braking force or braking torque to the brake hardware based on a brake pedal position;

an electric park brake; and a hold controller operably coupled to a sensor network of the vehicle to receive vehicle status information to:

determining that a first status condition is met when the vehicle is in park with the electric parking brake applied;

determining that a second status condition is met when the vehicle is not moving;

responsive to detecting a shift of the vehicle out of park when the first and second status conditions are both met, directing a build-up of brake pressure until a brake pressure target is reached; and holding the brake pressure at the brake pressure target until a release condition is met, wherein the release condition comprises an elapse of a predetermined period of time to enable handover to a hill start assist function.

12. The vehicle control system of claim 11, wherein the release condition comprises receiving a driver input indicating a pressure release request.

13. A vehicle control system comprising:

a gear selector operably coupled to a transmission of the vehicle to shift the vehicle between various states including at least drive, reverse and park;

a braking torque module operably coupled to brake hardware of the vehicle to provide braking force or braking torque to the brake hardware based on a brake pedal position;

an electric park brake; and a hold controller operably coupled to a sensor network of the vehicle to receive vehicle status information to:

determining that a first status condition is met when the vehicle is in park with the electric parking brake applied;

determining that a second status condition is met when the vehicle is not moving;

responsive to detecting a shift of the vehicle out of park when the first and second status conditions are both met, directing a build-up of brake pressure until a brake pressure target is reached; and holding the brake pressure at the brake pressure target until a release condition is met, wherein the brake pressure target is determined by:

determining a brake pressure requested by a driver of the vehicle based on a brake pedal input;

determining a hold pressure required to hold the vehicle based on a current vehicle state; and obtaining a minimum brake pressure defined for wear prevention of the electric parking brake.

14. The vehicle control system of claim 13, wherein the release condition comprises elapse of a predetermined period of time.

15. The vehicle control system of claim 14, wherein the predetermined period of time is selected as a delay period to enable handover to a hill start assist function.

16. The vehicle control system of claim 13, wherein the brake pressure target is a largest value among the brake pressure requested by the driver, the hold pressure and the minimum brake pressure defined for wear prevention.

17. The vehicle control system of claim 13, wherein the current vehicle state comprises an estimation of vehicle mass and a determination of an amount of slope of a surface on which the vehicle is parked.

18. The vehicle control system of claim 17, wherein the estimation of vehicle mass is determined based on vehicle weight and an estimation of vehicle load.

19. The vehicle control system of claim 18, wherein the hold pressure is determined from a table mapping the amount of slope and the estimation of vehicle mass to an estimated holding force.

20. The vehicle control system of claim 13, wherein the minimum brake pressure defined for wear prevention is a fixed value defined based on vehicle type.

\* \* \* \* \*